United States Patent
Ben-Yishay et al.

(10) Patent No.: US 10,958,323 B1
(45) Date of Patent: Mar. 23, 2021

(54) MIMO RADAR SYSTEM WITH DUAL MODE OUTPUT POWER AMPLIFICATION

(71) Applicant: SEMICONDUCTOR COMPONENTS INDUSTRIES, LLC, Phoenix, AZ (US)

(72) Inventors: Roee Ben-Yishay, Haifa (IL); Danny Elad, Kibutz Matzuva (IL)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/829,358

(22) Filed: Mar. 25, 2020

(51) Int. Cl.
*H04B 7/06* (2006.01)
*H04B 7/0456* (2017.01)
*G01S 7/40* (2006.01)
*G01S 13/931* (2020.01)
*H04B 7/08* (2006.01)

(52) U.S. Cl.
CPC .......... *H04B 7/0604* (2013.01); *G01S 7/4056* (2013.01); *G01S 13/931* (2013.01); *H04B 7/0465* (2013.01); *H04B 7/0608* (2013.01); *H04B 7/0682* (2013.01); *H04B 7/0693* (2013.01); *H04B 7/0808* (2013.01); *G01S 2013/9329* (2020.01)

(58) Field of Classification Search
CPC .. H04B 7/0691; H04B 7/0671; H04B 7/0602; H04B 7/0604; H04B 7/0608
See application file for complete search history.

(56) References Cited

U.S. PATENT DOCUMENTS

| | | | |
|---|---|---|---|
| 2005/0143024 A1 | 6/2005 | Sung et al. | |
| 2006/0030280 A1 | 2/2006 | Anderson et al. | |
| 2011/0092241 A1* | 4/2011 | Kawai | H04B 7/0404 455/509 |
| 2011/0273355 A1* | 11/2011 | Ahn | H01Q 3/24 343/860 |
| 2012/0140854 A1* | 6/2012 | Hamamatsu | H04B 7/0671 375/308 |
| 2019/0334483 A1* | 10/2019 | Balteanu | H03F 3/195 |

* cited by examiner

*Primary Examiner* — Kevin Kim
(74) *Attorney, Agent, or Firm* — Ramey & Schwaller, LLP

(57) ABSTRACT

An automotive radar system that is switchable between one or more high power modes and one or more increased channel modes. The radar system includes multiple transmit antennas, an integrated circuit including a transmit chain generating a positive transmit signal and a negative transmit signal that together form a differential transmit signal, and a coupling interface. The coupling interface configurably couples the differential transmit signal to two transmit antennas of the multiple transmit antennas to selectively drive the two transmit antennas in either a differential mode or in a power-combining mode that combines power from the positive transmit signal and negative transmit signal to drive a first transmit antenna of the multiple transmit antennas while isolating a second transmit antenna of the two transmit antennas.

15 Claims, 9 Drawing Sheets

MIMO RADAR SYSTEM WITH DUAL MODE OUTPUT POWER AMPLIFICATION

FIELD

This application pertains generally to frequency-modulated continuous-wave radar systems. This application pertains particularly to frequency-modulated continuous-wave radar systems having a multiple input multiple output (MIMO) architecture in which the number of transmitting elements is increased with minimal area and power penalty.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Many such arrays, however, are unable to provide a desired level of resolution without incurring too great a power and/or spacing penalty. Thus, there is room for improvement in the art.

SUMMARY

An example of this disclosure is an automotive radar system that includes multiple transmit antennas; an integrated circuit including a transmit chain generating a positive transmit signal and a negative transmit signal that together form a differential transmit signal; and a coupling interface that configurably couples the differential transmit signal to two transmit antennas of the multiple transmit antennas to selectively drive the two transmit antennas in either a first differential mode or in a second mode that combines power from the positive transmit signal and negative transmit signal to drive a first transmit antenna of the multiple transmit antennas while isolating a second transmit antenna of the two transmit antennas.

Another example of this disclosure is a method of driving a transmit array. The method of driving the transmit array includes generating a positive transmit signal and a negative transmit signal that together form a differential transmit signal; setting a transmit antenna coupling interface into a first configuration that uses the differential transmit signal to drive a first transmit antenna and to drive a second transmit antenna in a differential mode; and resetting the transmit antenna coupling interface into a second configuration that combines power from the positive transmit signal and negative transmit signal to drive the first transmit antenna while isolating the second transmit antenna.

Another example of this disclosure is a method of manufacturing an integrated radar front end circuit. The method of manufacturing includes providing one or more transmitters that each generate a positive transmit signal and a negative transmit signal that together form a differential transmit signal. The method of manufacturing also includes coupling the positive transmit signal and the negative transmit signal to output terminals for a first transmit antenna and a second transmit antenna using an interface that selectively drives the first transmit antenna and the second transmit antenna in either a first differential mode or in a second mode that combines power from the positive transmit signal and negative transmit signal to drive the first transmit antenna while isolating the second transmit antenna.

The accompanying drawings and following detailed description do not limit the disclosure, but on the contrary, they provide the foundation for understanding all modifications, equivalents, and alternatives falling within the scope of the appended claims. Specific configurations, parameter values, and examples are explanatory, not restrictive.

DETAILED DESCRIPTION

Figure 1:
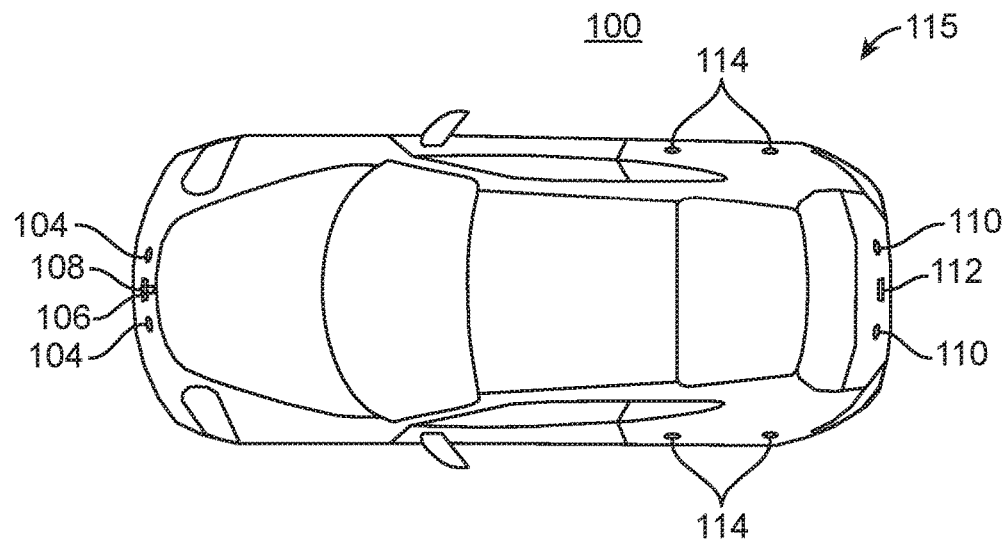
FIG. 1 illustrates a vehicle equipped with radar sensors, in accordance with an example of this disclosure.

FIG. 1 shows an illustrative vehicle 100 equipped with arrays 115 of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid-range sensing (e.g., for rear collision warning) may be placed behind the back-bumper cover. Antennas 114 for short range sensing (e.g., for blind spot monitoring and side obstacle detection) may be placed behind the car fenders. Each antenna and each set of antennas may be grouped in one or more arrays. Each array may be controlled by a radar array controller (205). Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
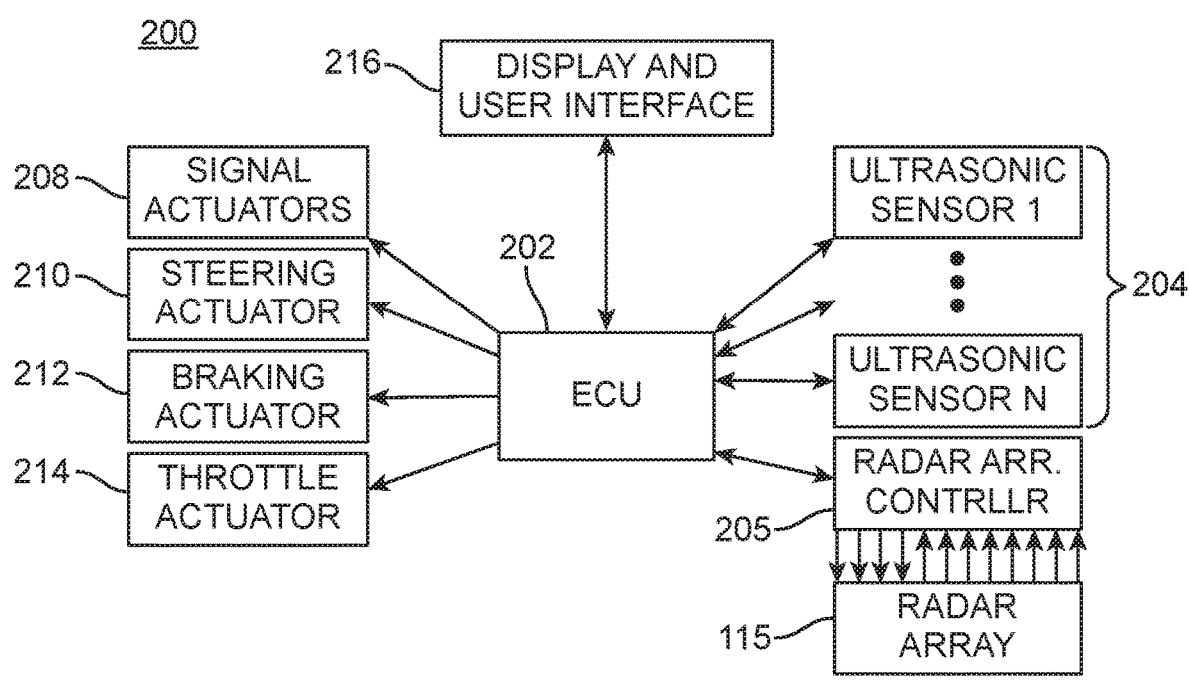
FIG. 2 is a block diagram of a driver-assistance system, in accordance with an example of this disclosure.

FIG. 2 is a block diagram of a driver-assistance system (control network) 200 for a vehicle (e.g., 100). Control network 200 includes an electronic control unit (ECU) 202 coupled to various ultrasonic sensors 204 and a radar array controller 205 as the center of a star topology. Other topologies including serial, parallel, and hierarchical (tree) topologies, are also suitable and contemplated for use in accordance with the principles disclosed herein. The radar array controller 205 couples to the transmit and receive antennas in the radar antenna arrays 115 to transmit electromagnetic waves, receive reflections, and determine a spatial relationship of the vehicle to its surroundings. The radar array controller 205 couples to carrier signal generators. In at least one example, the radar array controller 205 controls the timing and order of actuation of a plurality of carrier signal generators.

To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more ECU 202, and may be used by the ECU 202 to determine the automobile's status. The ECU 202 may further act on the status and incoming information to actuate various signaling and control transducers to adjust and maintain the automobile's operation. Among the operations that may be provided by the ECU 202 are various driver-assist features including automatic parking, lane following, automatic braking, and self-driving.

To gather the necessary measurements, the ECU 202 may employ a MIMO radar system. Radar systems operate by emitting electromagnetic waves which travel outward from the transmit antenna before being reflected towards a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector and its velocity relative to the vehicle. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented.

Figure 3:
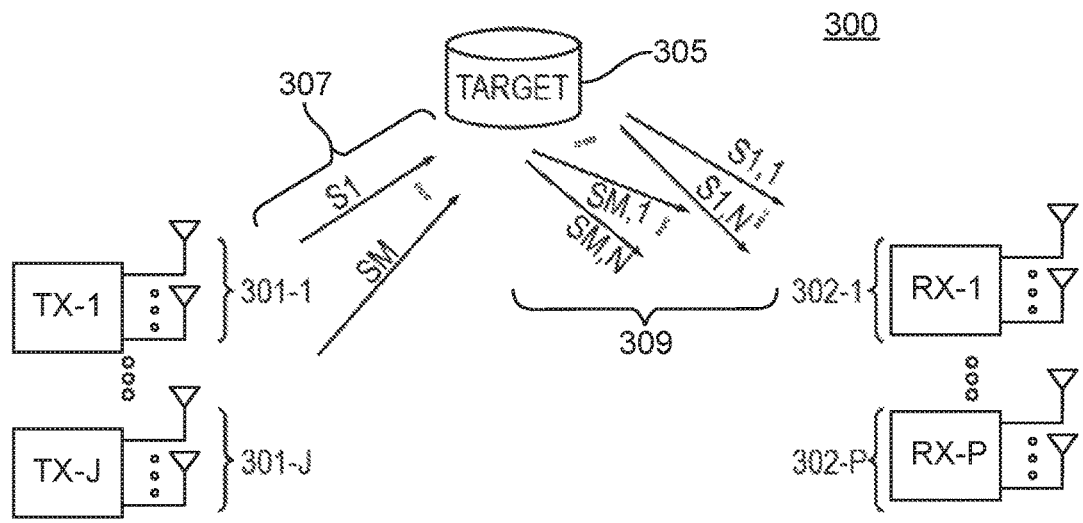
FIG. 3 illustrates a radar system, in accordance with an example of this disclosure.

FIG. 3 shows an illustrative radar system 300 having a MIMO configuration, in which J transmitters are collectively coupled to M transmit antennas 301 to send transmit signals 307. The M possible signals 307 may variously reflect from one or more targets 305 to be received as receive signals 309 via N receive antennas 302 coupled to P receivers. Each receiver may extract the amplitude and phase, or travel delay associated with each of the M transmit signals 307, thereby enabling the system to obtain N*M measurements (though only J*P of the measurements may be obtained concurrently). The processing requirements associated with each receiver extracting J measurements can be reduced via the use of time division multiplexing and/or orthogonal coding. The available antennas are systematically multiplexed to the available transmitters and receivers to collect the full set of measurements for radar imaging.

Figure 4:
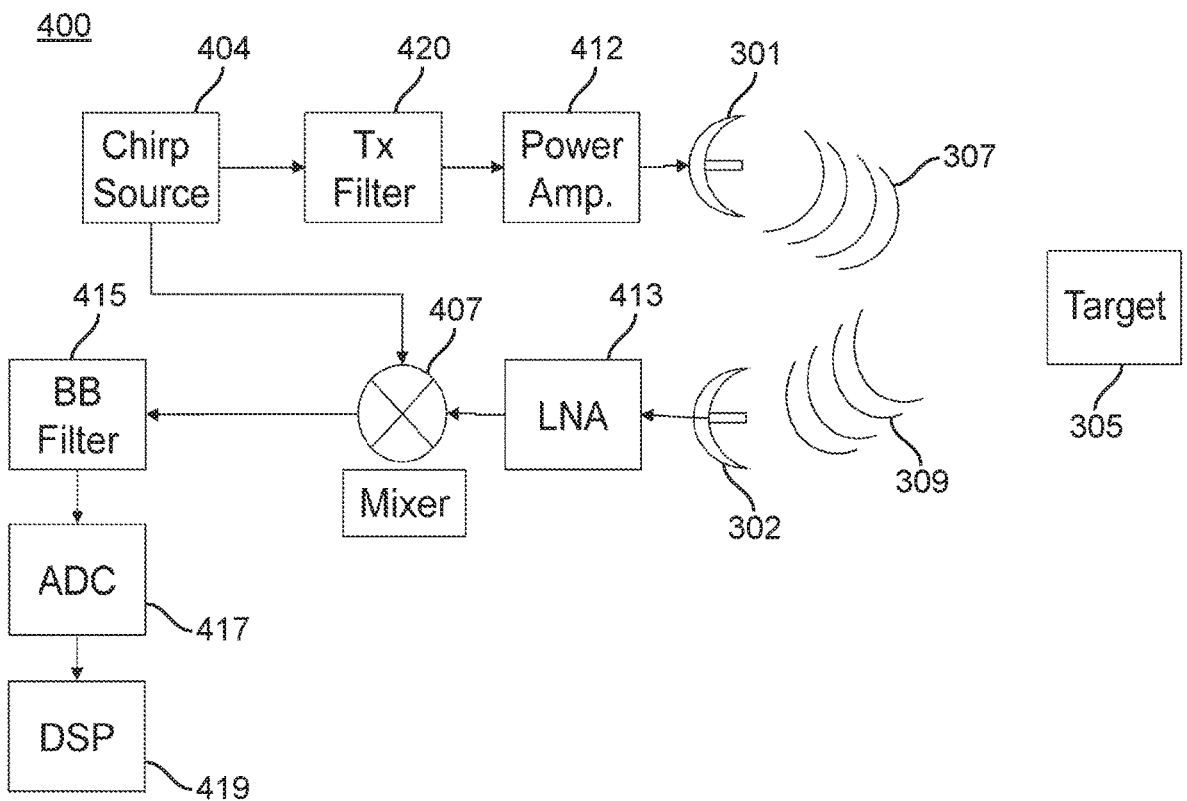
FIG. 4 illustrates a radar system, in accordance with an example of this disclosure.

FIG. 4 illustrates a radar system 400 (e.g., 300) in block diagram form, in accordance with an example of this disclosure. In at least one example, the radar system 400 is implemented as an integrated circuit in a packaged chip, such as a front-end chip. Radar system 400 includes a carrier signal generator 404, a transmission filter 420, an amplifier 412, and transmit antennas 301 which can transmit signals 307 based on the output of the carrier signal generator 404. Radar system 400 also includes receiver antennas 302, a low noise amplifier 413, and a mixer 407. Mixer 407 mixes signals detected by antennas 302 with the signal from the carrier signal generator 404. Low noise amplifier 413 is used to amplify signals 309 detected by antennas 302. Radar system 400 also includes a broadband filter 415, an analog-to-digital converter 417 and a processor 419 (e.g., 202, 205). The processor 419 and low noise amplifier 413 can be coupled for bi-directional communication as shown. Transmitted signals 307 are reflected off targets and the reflected signals 309 are received by receive antennas 302.

In examples of this disclosure, carrier signal generator 404 is coupled to the radar array controller 205. Carrier signal generator 404 includes a chirp generator to create a frequency-modulated continuous-wave (FMCW) signal. The chip rate of the carrier signal generator 404 may be controlled by the radar array controller 205. In at least one example, the carrier signal generator 404 can be deactivated by the radar array controller 205 to provide an unmodulated carrier signal. The carrier signal generator 404 may be implemented as a local oscillation (LO) signal generator as a fractional-N phase lock loop (PLL) with a $\Sigma\Delta$ controller, or as a direct-digital synthesis generator.

Carrier signal generator 404 is connected to transmit antennas 301 through transmission filter 420 and amplifier 412. Carrier signal generator 404 is connected to receiving antennas 302 through mixer 407 and low noise amplifier 413. Carrier signal generator 404 generates a signal (e.g., a chirp signal). Amplifier 412 receives the signal from carrier signal generator 404 and a transmission signal 307 corresponding to the signal from carrier signal generator 404 is transmitted using transmit antennas 301.

In digital beam-forming radar, spatial resolution is determined by the number of antennas in the radar array. Silicon area and power consideration limit the number of transmit chains allowed on a single chip. In accordance with examples of this disclosure, the number of transmitting elements of the array is doubled by connecting two antennas to a single transmit chain. In at least one example, a MIMO+ array may be implemented while incurring minimal area and/or power penalties.

In one or more examples of this disclosure, a radar system has a hybrid coupler configuration in which two single-ended amplifiers are driven differentially, while one of the branches includes a 0/−90 phase shifter. The outputs of the hybrid coupler configuration may be connected to two antennas using a hybrid coupler. When operated as a balanced amplifier, the coupled port of the hybrid coupler can be switched (terminated) for power summation in a single antenna.

Figure 5:
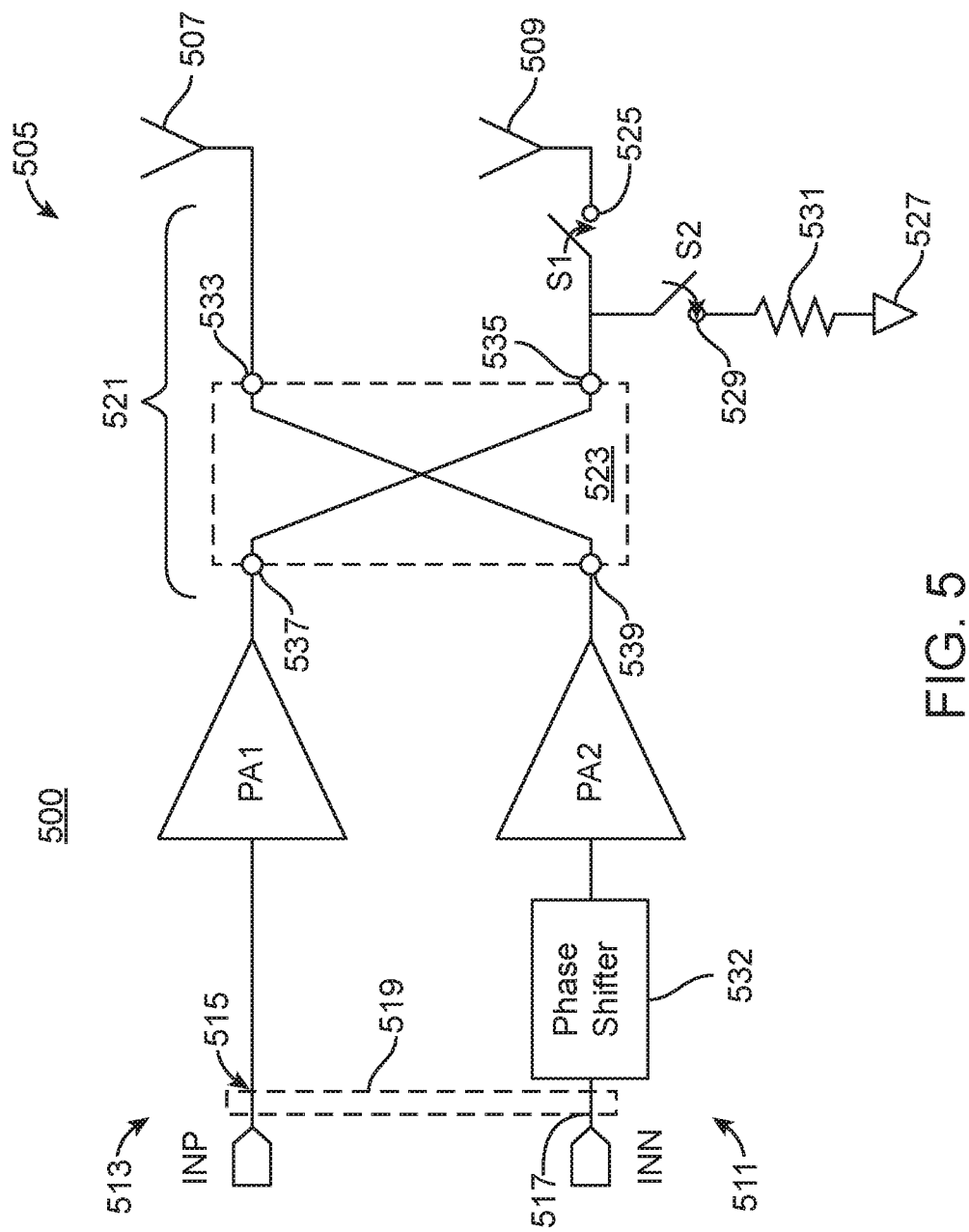
FIG. 5 illustrates a circuit for an automotive radar system, in accordance with an example of this disclosure.

FIG. 5 illustrates a circuit 500 for an automotive radar system (e.g., 300, 400), in accordance with an example of this disclosure. The circuit 500 corresponds to a hybrid coupler arrangement. The circuit 500 includes multiple antennas 505 including a first transmit antenna 507 and a second transmit antenna 509. In at least one example of this disclosure, at least some portion of the circuit 500 resides on an integrated circuit 511. The integrated circuit 511 includes a transmit chain 513 (corresponding to input port INP and input port INN). Transmit chain 513 generates a positive transmit signal 515 and a negative transmit signal 517 that together form a differential transmit signal 519. In at least one example, the circuit 500 includes a coupling interface 521 that includes a hybrid coupler 523 as well as a first switch S1 and a second switch S2. Switch S1 is switchable from an open position in which S1 is not coupled to the second antenna 509 to a closed position in which S1 is coupled to the second antenna 509 such as by contacting pin (antenna port) 525 of second antenna 509. Switch S2 is switchable from an open position in which S2 is not coupled ground 527 to a closed position in which S2 is coupled to ground 527 such as by connecting to pin 529 connected to ground 527. In some examples, an impedance or resistance (e.g., 531) is interposed between pin 529 and ground 527. Circuit 500 also includes a phase shifter 532. In at least one example, phase shifter 532 couples the negative transmit signal 517 to the hybrid coupler 523.

In accordance with one or more examples of this disclosure, the circuit 500 is switchable between a first configuration and a second configuration. In a first configuration of the circuit 500, switch S1 is closed and switch S2 is open. In the first configuration of the circuit 500, the circuit 500 operates in a differential mode, in which the differential transmit signal 519 is transmitted to the first transmit antenna 507 and the second transmit antenna 509.

In a second configuration of the circuit 500, switch S1 is open and switch S2 is closed. In the second configuration of the circuit 500, circuit 500 operates in a power-combing mode, in which power from the positive transmit signal 515 and the negative transmit signal 517 drive the first transmit 507 while the second transmit antenna 509 is isolated. In accordance with one or more examples of this disclosure, the circuit 500 is switchable (such as by a user or triggered by environmental conditions) between the first configuration, in which more transmit antennas provide greater angular resolution (at shorter distances), and the second configuration, in which fewer (one-half) transmit antennas provide readings for greater distances, but at lower resolution (than the first configuration.)

In at least one example of this disclosure, the hybrid coupler 523 is a 90-degree hybrid coupler having a first output port 533 and a second output port 535. The first output port 533 is coupled to the first transmit antenna 507 and the second output port is alternately and switchably connected to the second antenna 509 or ground 527, depending on whether switch S1 is closed and switch S2 is open, or in the alternative, if switch S1 is open and switch S2 is closed.

The hybrid coupler 523 includes a first input port 537 and a second input port 539. In at least one example of this disclosure, the first input port 537 is coupled to receive the positive transmit signal 515. In at least one example, the second input port 539 of the hybrid coupler 523 receives negative transmit signal 517 through phase shifter 532. In some examples, the phase shifter 532 is configurable to shift the negative transmit signal 517 by zero degrees in a first configuration and to shift the negative transmit signal 517 positively by 90 (ninety) degrees in a second configuration. In some examples, the phase shifter 532 is configurable to shift the negative transmit signal 517 by zero degrees in a first configuration and shift the negative transmit signal 517 negatively by 90 (ninety) degrees in a second configuration.

In some examples, the phase shifter 532 is configurable to shift the negative transmit signal 517 negatively by 90 (ninety) degrees in a first configuration, shift the negative transmit signal 517 by zero degrees in a second configuration, and to shift the negative transmit signal 517 positively by 90 (ninety) degrees in a third configuration.

In at least one example of this disclosure, circuit 500 also includes a first power amplifier PA1 that amplifies the positive transmit signal 515 of the first input port 537 of the 90-degree hybrid coupler 523. In some examples, the circuit 500 also includes a second power amplifier PA2 that amplifies the negative transmit signal 517 of the second input port 539 of the 90-degree hybrid coupler 523.

In at least one example, circuit 500 enables simultaneous transmission from two antennas, while the area of the integrated chip on which the circuit 500 resides is not affected, because the switches S1, S2 are significantly smaller than power-combining structures.

Figure 6A:
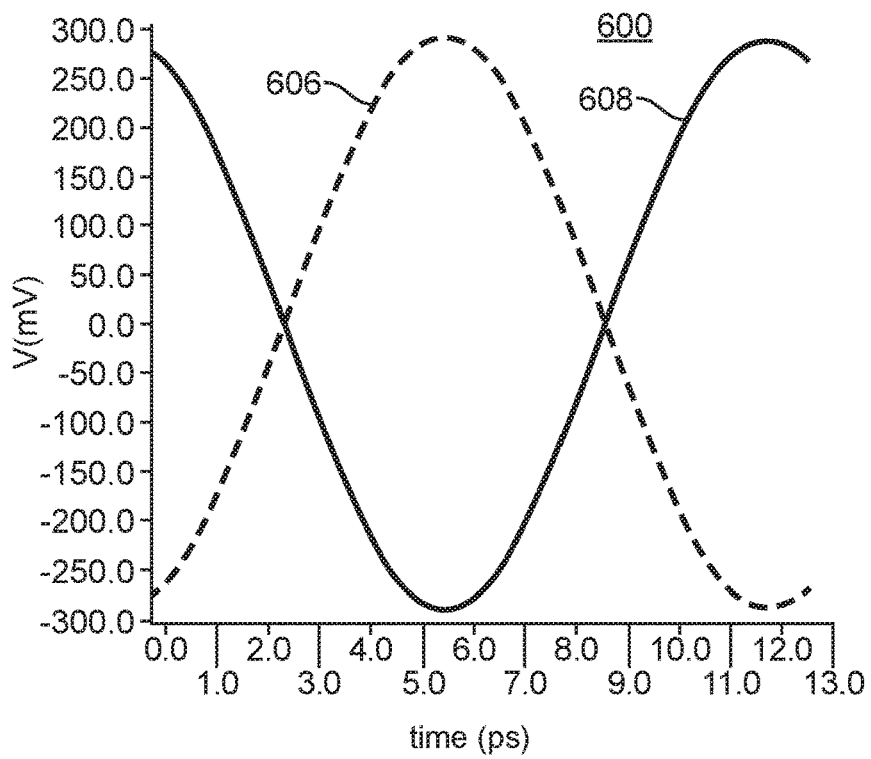
FIG. 6A is a plot of output of the circuit of FIG. 5, in accordance with an example of this disclosure.

FIG. 6A is a plot 600 of the output of circuit (500), in accordance with an example of this disclosure. The plot 600 corresponds to an operating configuration of the circuit (500) in which the phase shifter (532) is set to 0 (zero), switch S1 is closed, and switch S2 is open. Since the phase shifter (532) does not rotate the negative transmit signal 517, the transmission signal 606 from the first antenna (507) is ninety degrees out of phase with the transmission signal 608 from the second antenna (509). The amplitude (power) of the transmission signal 606 from the first antenna (507) is substantially equal to the amplitude (power) of the transmission signal 608 from the second antenna (509). The transmission signal 606 of the first antenna (507) can be shifted in accordance with the setting(s) of the phase shifter (532). Since the coupler (523) is symmetrical, if the signals received at input port (537) and input port (539) are differential, the signals output from output port (533) and output port (535) are also differential and equal in amplitude.

Figure 6B:
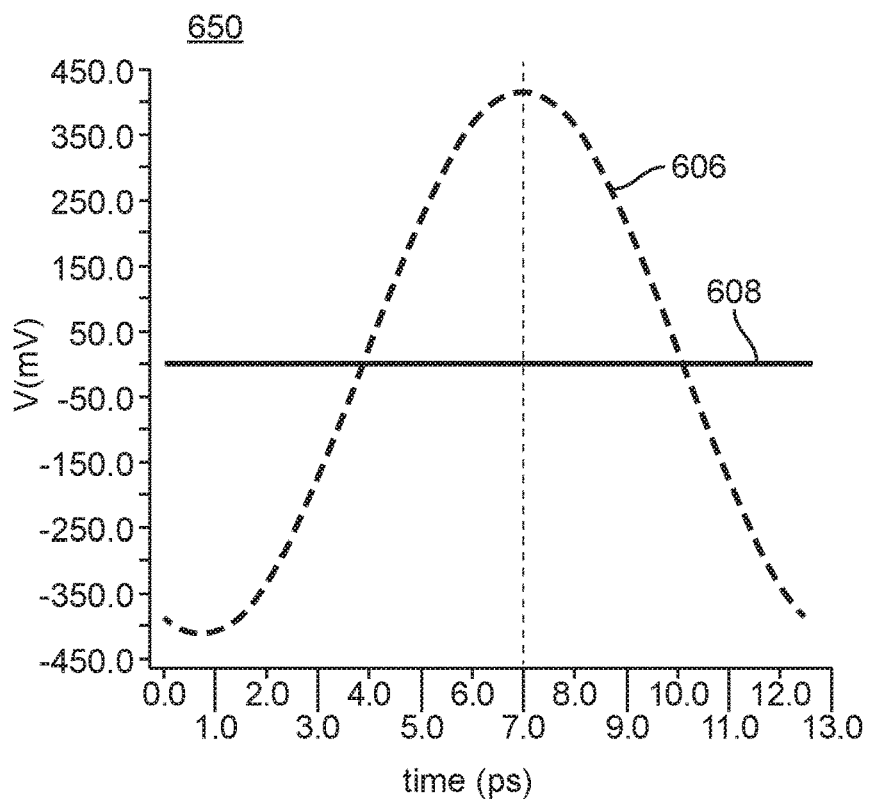
FIG. 6B is a second plot of output of the circuit of FIG. 5, in accordance with an example of this disclosure.

FIG. 6B is another plot 650 of the output of circuit (500), in accordance with an example of this disclosure. The plot 650 corresponds to an operating configuration of the circuit (500) in which the phase shifter (532) is set to 90 (ninety) degrees, switch S1 is open, and switch S2 is closed. While the amplitude (power) of the second antenna (509) is virtually 0 (zero), because switch S2 is open, the amplitude (power) of the transmission signal 606 from the first antenna (507) is approximately 412.5 mV, which is substantially greater than was the case when the first antenna (507) received the negative transmission signal (517) and the second antenna (509) received the positive transmission signal (515) when the circuit (500) was in the operating configuration corresponding to FIG. 6A. The amplitude at the antenna port (525) and the output port (535) is zero due to signal cancellation at the coupler port (539) caused by the phase shift performed by the phase shifter (532). Switch S1 enables antenna 509 to be disconnected when the 50 ohm termination (529, 531, 527) is connected to avoid additional loading which would lead to impedance mismatch; the coupler (523) needs to "see" the 50 ohm termination (529, 531, 527).

In one or more examples of this disclosure, a radar circuit has a differential configuration, in which a fully differential amplifier is transformer-coupled to two antennas. Both ports of the secondary coil of transformer can be switched-shorted to ground for power summation in a single antenna.

Figure 7:
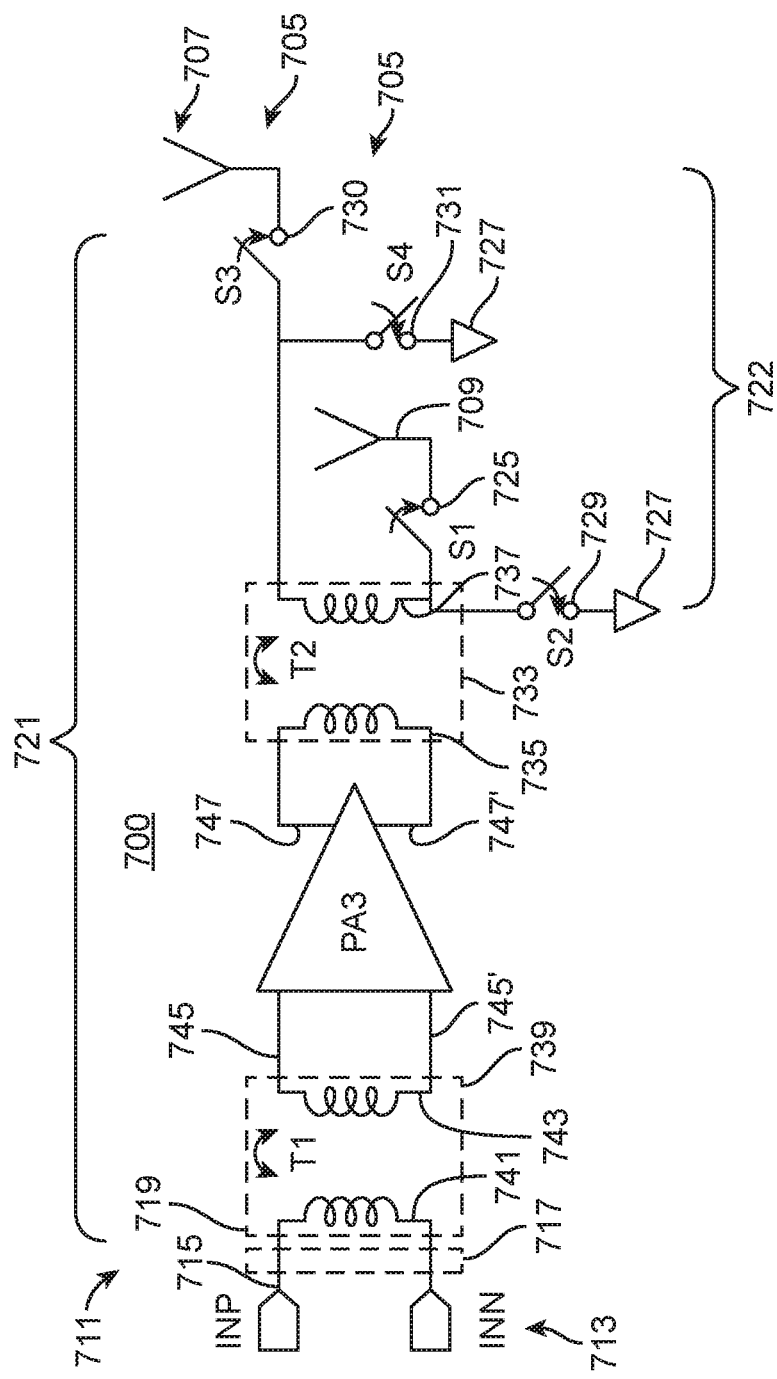
FIG. 7 illustrates a circuit for an automotive radar system, in accordance with an example of this disclosure.

FIG. 7 illustrates a circuit 700 for an automotive radar system (e.g., 300, 400), in accordance with an example of this disclosure. The circuit 700 includes multiple antennas 705 including a first transmit antenna 707 and a second transmit antenna 709. In at least one example of this disclosure, at least some portion of the circuit 700 resides on an integrated circuit 711. The integrated circuit 711 includes a transmit chain 713 (corresponding to input port INP and input port INN). Transmit chain 713 generates a positive transmit signal 715 and a negative transmit signal 717 that together form a differential transmit signal 719. In at least one example, the circuit 700 includes a coupling interface 721 that includes switch arrangement 722 that includes a first switch S1, a second switch S2, a third switch S3, and a fourth switch S4. Switch S1 is switchable from an open position in which S1 is not coupled to the second antenna 709 to a closed position in which S1 is coupled to the second antenna 709 such as by contacting pin 725 of second antenna 709. Switch S2 is switchable from an open position in which S2 is not coupled ground 727 to a closed position in which S2 is coupled to ground 727 such as by connecting to pin 729 connected to ground 727. In some examples, an impedance or resistance (not shown) is interposed between pin 729 and ground 727.

Switch S3 is switchable from an open position in which S3 is not coupled to the first antenna 707 to a closed position in which S3 is coupled to the first antenna 707, such as by contacting pin 730 of first antenna 707. Switch S4 is switchable from an open position in which S4 is not coupled ground 727 to a closed position in which S4 is coupled to ground 727, such as by connecting to pin 731 connected to ground 727. In some examples, an impedance or resistance (not shown) is interposed between pin 731 and ground 727.

In accordance with one or more examples of this disclosure, the circuit 700 is switchable between a first configuration, a second configuration, and a third configuration using a switch arrangement. In at least one example, the switch arrangement 722 includes switch S1, switch S2, switch S3, and switch S4. In a first configuration of the circuit 700, switch S1 is closed and switch S2 is open, and switch S3 is closed and switch S4 is open. In the first configuration of the circuit 700, the circuit 700 operates in a differential mode, in which the differential transmit signal 719 is transmitted to the first transmit antenna 707 and the second transmit antenna 709. In a second configuration of the circuit 700, switch S1 is open and switch S2 is closed, and switch S3 is closed and switch S4 is open. In the second configuration of the circuit 700, the circuit 700 operates in a (first) power-combining mode, in which power from the positive transmit signal 715 and the negative transmit signal 717 drive the first transmit antenna 707 while the second transmit antenna 709 is isolated. In a third configuration of the circuit 700, switch S1 is closed and switch S2 is open, and switch S3 is open and switch S4 is closed. In the third configuration of the circuit 700, in which the circuit 700 operates in a second power-combining mode, power from the positive transmit signal 715 and the negative transmit signal 717 drive the second transmit antenna 709 while the first transmit antenna 707 is isolated. In accordance with one or more examples of this disclosure, circuit 700 is switchable (such as by a user or triggered by environmental conditions) from the differential mode to either the first power-combining mode or the second power-combining mode. In at least one example, circuit 700 is switchable (such as by a user or triggered by environmental conditions) from the first power-combining mode to either the differential mode or the second power-combining mode. In at least one other example, circuit 700 is switchable (such as by a user or triggered by environmental conditions) from the second power-combining mode to either the differential mode or the first power-combining mode.

In accordance with one or more examples of this disclosure, the circuit 700 is switchable between the first configuration, the second configuration, and the third configuration. In the first and third configurations of circuit 700, fewer transmit antennas 705 provide readings for greater distances, while in the second configuration, more transmit antennas 705 provide greater angular resolution for shorter distances.

In at least one example of this disclosure, circuit 700 also includes a power amplifier PA3 that amplifies the differential signal 719. In one or more examples, the coupling interface 721 of circuit 700 includes an output transformer 733 having a primary 735 coupled between the positive transmit signal 715 and the negative transmit signal 717, and having a secondary 737 selectively coupled between the first transmit antenna 707 and the second transmit antenna 709.

In at least one example of this disclosure, in the first configuration of the circuit 700, switch arrangement 722 connects a terminal of the secondary 737 to antenna 709, connects an opposite terminal of the secondary 737 of the output transformer 733 to the first transmit antenna 707, and in the third configuration connects the opposite terminal of the secondary 737 of the output transformer to ground 727.

In accordance with one or more examples, the coupling interface 721 of circuit 700 includes input transformer 739 having a primary 741 and a secondary 743. In at least one example, the power amplifier PA3 receives input signal 745 from input transformer 739, amplifies the input signal 745, and outputs the amplified signal 747 to the output transformer 733. In some examples, the primary 741 of the input transformer 739 is coupled between the positive transmit signal 715 and the negative transmit signal 717, the secondary 743 of the input transformer 739 is coupled to the input 745 of the power amplifier PA3, and the output signal 747 of the power amplifier PA3 is connected to the primary 735 of the output transformer 733.

In at least one example of this disclosure, when both S1 and S4 are open, and both S2 and S3 are closed, output transformer 733 acts as a BALUN and power from both PAs is combined in the first antenna 707. In at least one example of this disclosure, when both S1 and S4 are closed, and both S2 and S3 are open, output transformer 733 acts as a BALUN and power from both PAs is combined in the second antenna 709.

In at least one example, circuit 700 enables simultaneous transmission from two antennas, while the area of the integrated chip on which the circuit 700 resides is not affected, as the switches S1, S2, S3, S4 are significantly smaller than power-combining structures.

Figure 8A:
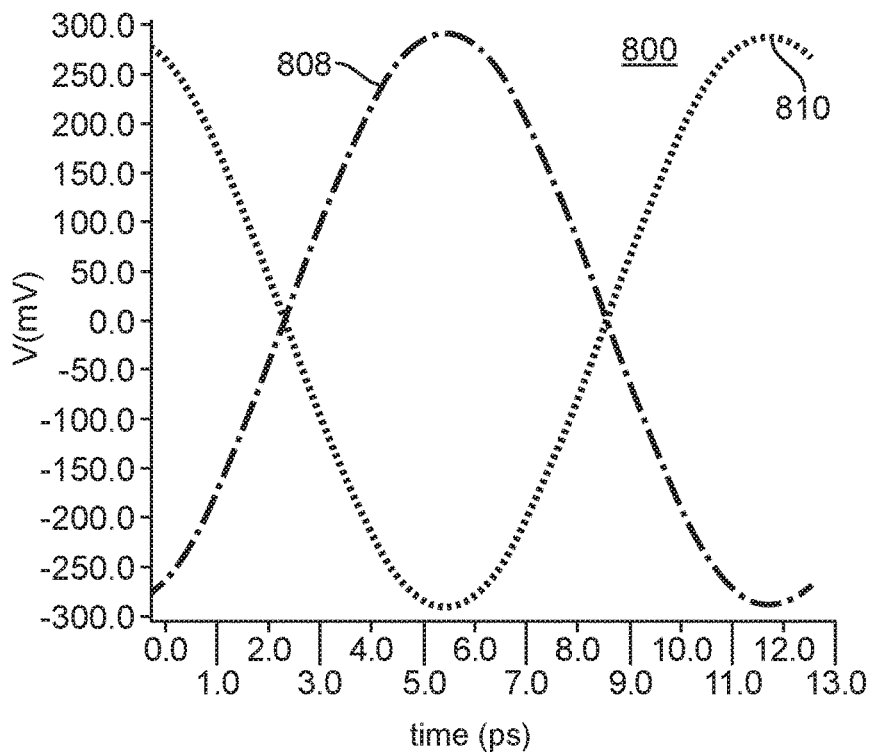
FIG. 8A is a plot of output of the circuit of FIG. 7, in accordance with an example of this disclosure.

FIG. 8A is a plot 800 of the output of circuit (700), in accordance with an example of this disclosure. The plot 800 corresponds to an operating configuration of the circuit (700) in which switch S1 and S3 are closed, and switch S2 and S4 are open. The transmission signal 808 from the first antenna (707) is 180 degrees out of phase with the transmission signal 810 from the second antenna (709). The amplitude (power) of the transmission signal 808 from the first antenna (707) is substantially equal to the amplitude (power) of the transmission signal 810 from the second antenna (709).

Figure 8B:
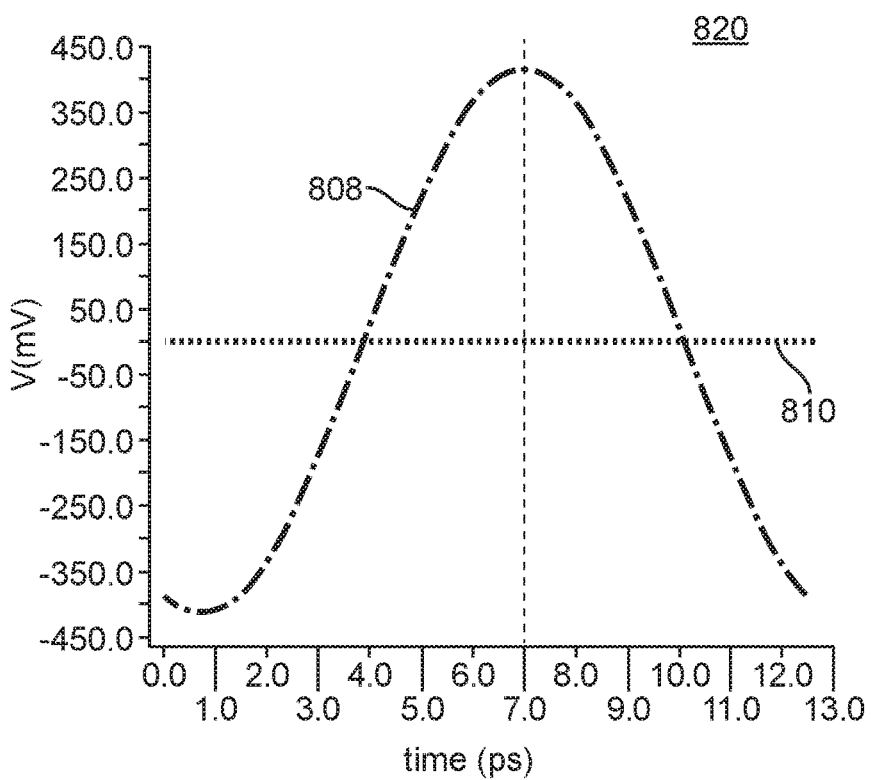
FIG. 8B is another plot of output of the circuit of FIG. 7, in accordance with an example of this disclosure.

FIG. 8B is another plot 820 of the output of circuit (700), in accordance with an example of this disclosure. The plot 820 corresponds to an operating configuration of the circuit (700) in which switch S1 is open, switch S2 is closed, switch S3 is open and switch S4 closed. While the amplitude (power) of the transmission signal 810 of second antenna (709) is virtually 0 (zero)—because switch S1 is open (e.g., not connecting to pin (725))—the amplitude (power) of the transmission signal 808 from the first antenna (707) is approximately √2 greater than in the case when both the first antenna (707) and the second antenna receive the differential signal 719 and transmit, (e.g., when the circuit (700) was in the operating configuration corresponding to FIG. 8A).

Figure 8C:
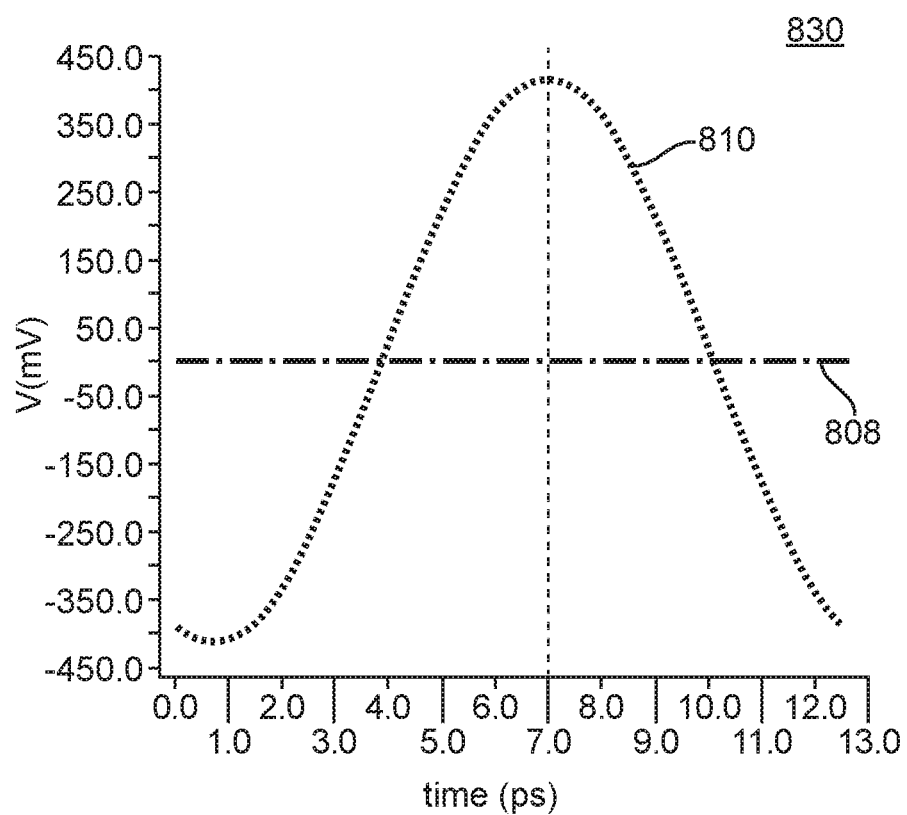
FIG. 8C is a plot of output of the circuit of FIG. 7, in accordance with an example of this disclosure.

FIG. 8C is another plot 830 of the output of circuit (700), in accordance with an example of this disclosure. The plot 830 corresponds to an operating configuration of the circuit (700) in which switch S1 is closed, switch S2 is open, switch S3 is closed and switch S4 open. While the amplitude (power) of the transmission signal 808 of first antenna (707) is virtually 0 (zero)—because switch S3 is open (e.g., not connecting to pin (730))—the amplitude (power) of the transmission signal 810 from the first antenna (707) is substantially greater than was the case when both the first antenna (707) and the second antenna received the differential signal 719 concurrently, (when the circuit (700) was in the operating configuration corresponding to FIG. 8A).

Figure 9A:
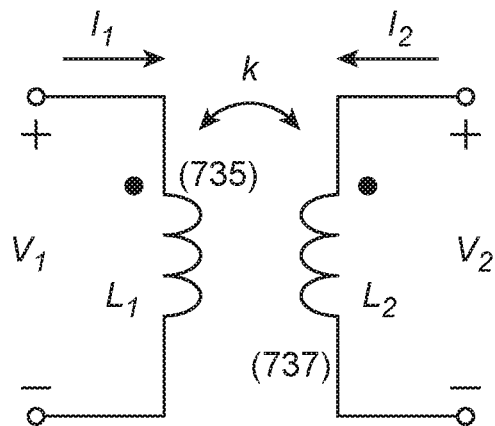
FIG. 9A illustrates an idealized version of an output transformer, in accordance with an example of this disclosure.

FIG. 9A illustrates an idealized version 900 of the output transformer (733) shown in FIG. 7, in which V1 corresponds to the output signal 747 from PA3 to the primary 735 of output transformer (733), and V2 corresponds to the voltage across opposing ends of the secondary 737 delivered to the first antenna (707), the second antenna (709), and the switching arrangement (722). 11 corresponds to current flowing across the primary 735 and 12 corresponds to current flowing across the secondary. L1 corresponds to the self-inductance of the primary (735), L2 corresponds to the self-inductance of secondary (737), and k is the transformer coupling coefficient.

An ideal transformer 900 with 1:n input/output ratio presents a different load impedance ($Z_L$) to a power amplifier (e.g., PA3) when switching from a differential antenna mode, in which both the first antenna (707) and the second antenna (709) receive the differential signal (719) into a single ended mode in which only the first antenna (707) or the second antenna (709) receives the differential signal (719). Theoretically, the load impedance ($Z_L$) is greater when both the first antenna (707) and the second antenna (709) receive the differential signal (719) than (e.g., 50 ohms) when only the first antenna (707) or the second antenna (709) receives the differential signal (719). However, as explained with reference to FIG. 9B below, these issues associated with an ideal transformer 900 are overcome in accordance with one or more examples of this disclosure.

Figure 9B:
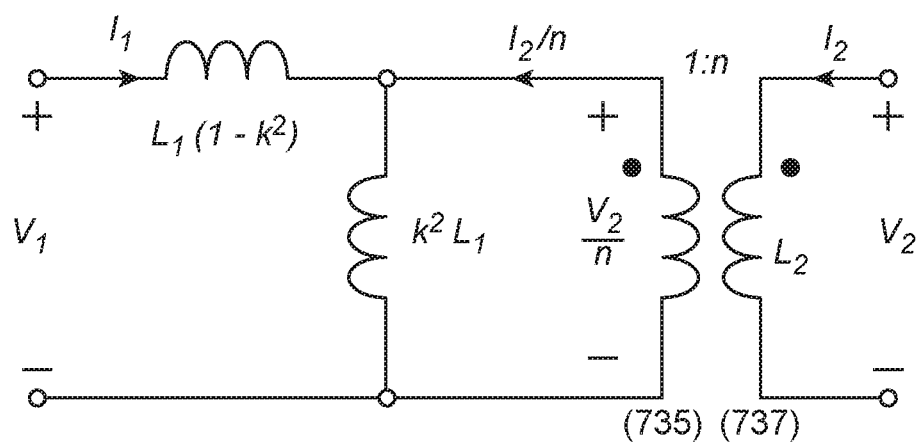
FIG. 9B illustrates an on-chip implementation of the circuit of FIG. 7, in accordance with an example of this disclosure.

FIG. 9B illustrates an on-chip implementation 950 of circuit (700), in accordance with an example of this disclosure. The on-chip transformer implementation 950 has finite self-inductances (L1, L2) and non-ideal coupling between components, which can be utilized for matching. In realizing circuit (700) design parameters such as the size of the circuit (700), L1, L2, and k may be selected to match both a single-ended impedance (e.g., 500) and a differential impedance (1000) to the desired optimum load ($Z_L$) of the antennas (707, 709) and the switching arrangement (722) with relatively small variation over the operating bandwidth of the circuit (700). In some examples no additional matching elements are needed. In some examples, additional matching elements such as fixed capacitors may be used to enhance performance, such as by widening bandwidth for example. In some examples, one or more fixed components such as shunt capacitor (not shown) can be added to further enhance flexibility.

Figure 10A:
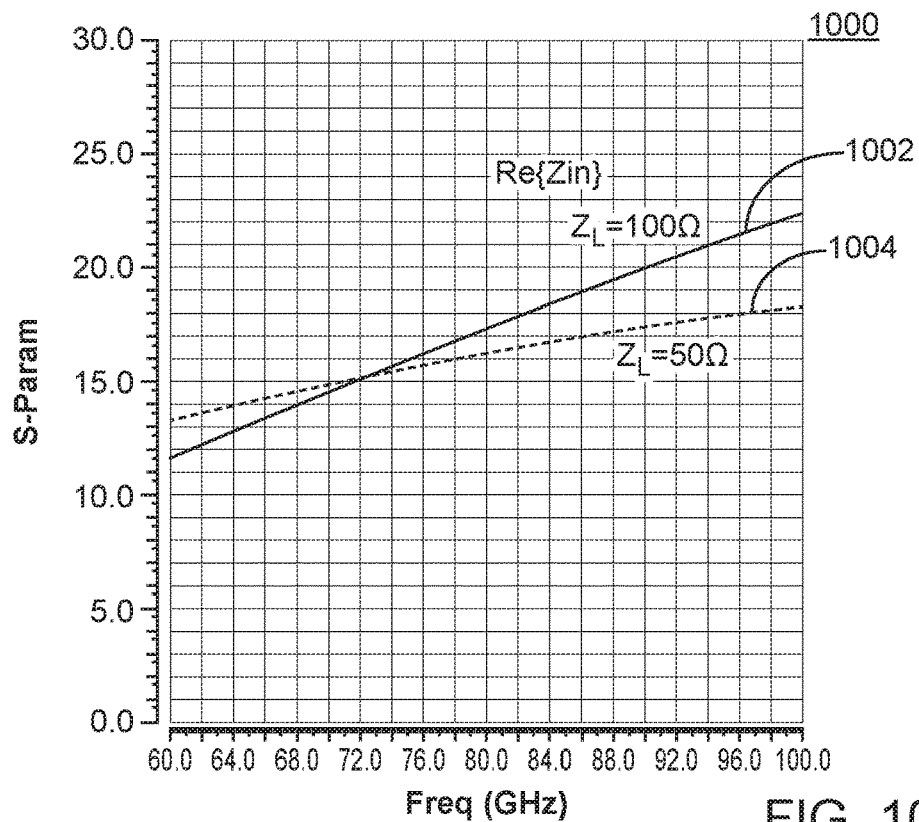
FIG. 10A is a plot of input impedance of the circuit in FIG. 7, in accordance with an example of this disclosure.

FIG. 10A is a plot 1000 of the input impedance, looking into the transformer primary versus operating frequency for circuit (700) over an operating frequency range from 60 (sixty) GHz to 100 (one hundred) GHz. Line 1002 indicates the relationship between operating frequency and the real part of the input impedance ($Z_{in}$) for a load impedance ($Z_L$) of 100 ohms, when only the first antenna 707 or the second antenna 709 is coupled to the output transformer (733) Line 1004 indicates the relationship between operating frequency and the real part of the input impedance ($Z_{in}$) for a load impedance ($Z_L$) of 50 ohms, when only the first antenna 707 or the second antenna 709 is coupled to the output transformer (733).

Figure 10B:
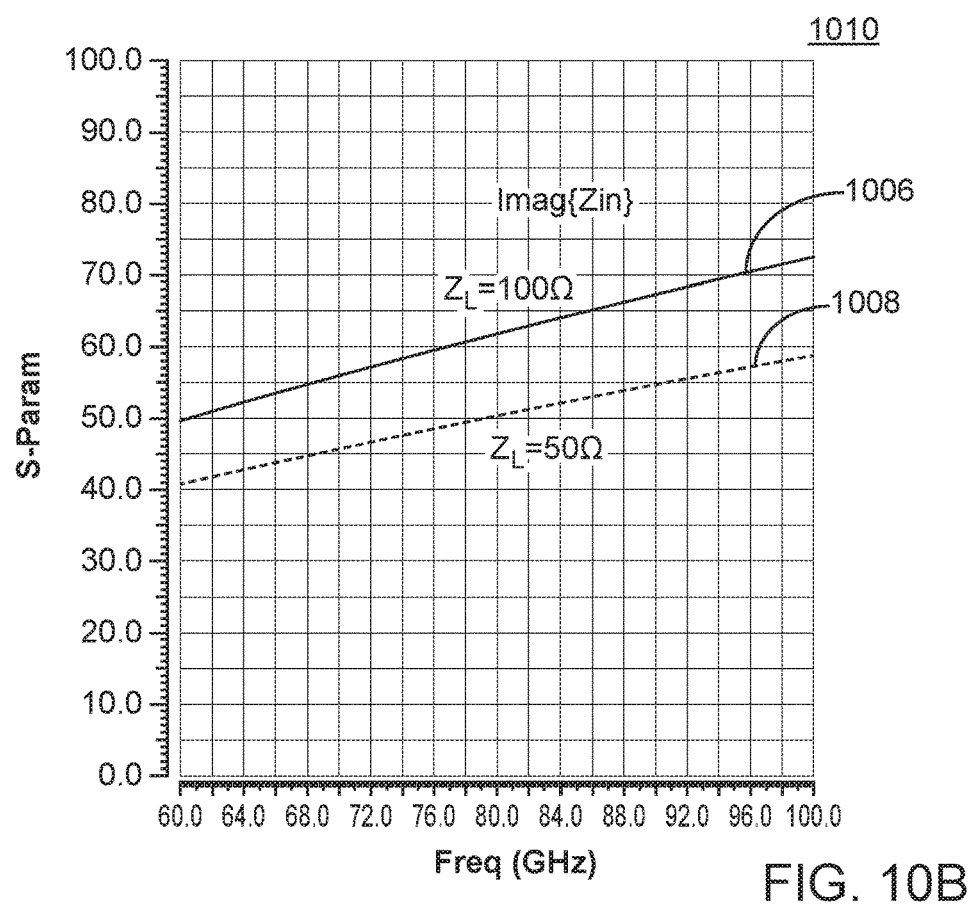
FIG. 10B is another plot of input impedance of the circuit in FIG. 7, in accordance with an example of this disclosure.

FIG. 10B is a second plot 1010 of the input impedance, looking into the transformer primary versus operating frequency for circuit (700) over an operating frequency range from 60 (sixty) GHz to 100 (one hundred) GHz. Line 1006 indicates the relationship between operating frequency and the imaginary part of the input impedance ($Z_{in}$) for a load impedance ($Z_L$) of 100 ohms, when only the first antenna 707 or the second antenna 709 is coupled to the output transformer (733) Line 1008 indicates the relationship between operating frequency and the imaginary part of the input impedance ($Z_{in}$) for a load impedance ($Z_L$) of 50 ohms, when only the first antenna 707 or the second antenna 709 is coupled to the output transformer (733).

Various aspects and/or components of the described examples may be used singly or in any combination. The examples set forth in this disclosure are illustrative and explanatory. The scope of the inventions of this disclosure are set forth in the following claims.

What is claimed is:

1. A method of driving a transmit array, the method comprising:
    generating a positive transmit signal and a negative transmit signal that together form a differential transmit signal;
    setting a transmit antenna coupling interface into a first configuration that uses the differential transmit signal to drive a first transmit antenna and to drive a second transmit antenna; and
    switching the transmit antenna coupling interface into a second configuration that combines power from the positive transmit signal and negative transmit signal to drive the first transmit antenna while isolating the second transmit antenna,
    wherein the transmit antenna coupling interface comprises:
        a 90-degree hybrid coupler having a first output port coupled to the first transmit antenna and a second output port coupled to the second transmit antenna, and having a first input port coupled to receive the positive transmit signal; and
        a configurable phase shifter that couples the negative transmit signal to a second input port of the 90-degree hybrid coupler, wherein in the first configuration the configurable phase shifter is set to zero degrees and in the second configuration the configurable phase shifter is set to negative 90 degrees.

2. The method of claim 1, wherein the transmit antenna coupling interface further comprises:
    a first power amplifier that amplifies the positive transmit signal of the first input port of the 90-degree hybrid coupler; and
    a second power amplifier that amplifies the negative transmit signal of the second input port of the 90-degree hybrid coupler.

3. A method of driving a transmit array, the method comprising:
- generating a positive transmit signal and a negative transmit signal that together form a differential transmit signal;
- setting a transmit antenna coupling interface into a first configuration that uses the differential transmit signal to drive a first transmit antenna and to drive a second transmit antenna; and
- switching the transmit antenna coupling interface into a second configuration that combines power from the positive transmit signal and negative transmit signal to drive the first transmit antenna while isolating the second transmit antenna,
- wherein the transmit antenna coupling interface comprises:
  - an output transformer having a primary coupled between the positive transmit signal and the negative transmit signal, and having a secondary selectively coupled between the first transmit antenna and the second transmit antenna; and
  - a switch arrangement that in the first configuration connects a terminal of the secondary to the second transmit antenna, and that in the second configuration connects the terminal to ground.

4. The method of claim 3, wherein the transmit antenna coupling interface further comprises:
- a second switch arrangement that in the first configuration connects an opposite terminal of the secondary of the output transformer to the first transmit antenna, and that in a third configuration connects the opposite terminal of the secondary of the output transformer to ground.

5. The method of claim 4, wherein the transmit antenna coupling interface further comprises:
- an input transformer having a primary and a secondary; and
- a power amplifier having input ports and output ports,
- wherein the primary of the input transformer is coupled between the positive transmit signal and the negative transmit signal, the secondary of the input transformer is coupled to the input ports of the power amplifier, and the output ports of the power amplifier are connected to the primary of the output transformer.

6. An automotive radar system that comprises:
- multiple transmit antennas;
- an integrated circuit including a transmit chain generating a positive transmit signal and a negative transmit signal that together form a differential transmit signal; and
- a coupling interface that configurably couples the differential transmit signal to two transmit antennas of the multiple transmit antennas to selectively drive the two transmit antennas in either a differential mode or in a power-combining mode that combines power from the positive transmit signal and negative transmit signal to drive a first transmit antenna of the multiple transmit antennas while isolating a second transmit antenna of the two transmit antennas, wherein the coupling interface comprises:
  - a 90-degree hybrid coupler having a first output port coupled to the first transmit antenna and a second output port coupled to the second transmit antenna, and having a first input port coupled to receive the positive transmit signal; and
  - a configurable phase shifter that couples the negative transmit signal to a second input port of the 90-degree hybrid coupler, wherein the configurable phase shifter is alternately set to zero degrees corresponding to the differential mode or set to 90 degrees corresponding to the power-combining mode.

7. The automotive radar system of claim 6, wherein the coupling interface further comprises:
- a first power amplifier that amplifies the positive transmit signal of the first input port of the 90-degree hybrid coupler; and
- a second power amplifier that amplifies the negative transmit signal of the second input port of the 90-degree hybrid coupler.

8. An automotive radar system that comprises:
- multiple transmit antennas;
- an integrated circuit including a transmit chain generating a positive transmit signal and a negative transmit signal that together form a differential transmit signal; and
- a coupling interface that configurably couples the differential transmit signal to two transmit antennas of the multiple transmit antennas to selectively drive the two transmit antennas in either a differential mode or in a power-combining mode that combines power from the positive transmit signal and negative transmit signal to drive a first transmit antenna of the multiple transmit antennas while isolating a second transmit antenna of the two transmit antennas, wherein the coupling interface comprises:
  - an output transformer having a primary coupled between the positive transmit signal and the negative transmit signal, and having a secondary selectively coupled between the first transmit antenna and the second transmit antenna; and
  - a switch arrangement that in a first configuration corresponding to the differential mode connects a terminal of the secondary to the second transmit antenna, and that in a second configuration corresponding to the power-combining mode connects the terminal to ground.

9. The automotive radar system of claim 8, wherein the coupling interface further comprises:
- a second switch arrangement that in the first configuration connects an opposite terminal of the secondary of the output transformer to the first transmit antenna, and that in a third configuration connects the opposite terminal of the secondary of the output transformer to ground.

10. The automotive radar system of claim 9, wherein the coupling interface further comprises:
- an input transformer having a primary and a secondary; and
- a power amplifier having input ports and output ports,
- wherein the primary of the input transformer is coupled between the positive transmit signal and the negative transmit signal, the secondary of the input transformer is coupled to the input ports of the power amplifier, and the output ports of the power amplifier are connected to the primary of the output transformer.

11. A method of manufacturing an integrated radar front end circuit, the method comprising:
- providing one or more transmitters, each of the one or more transmitters operable to generate a positive transmit signal and a negative transmit signal that together form a differential transmit signal; and
- coupling the one or more transmitters to an interface, wherein the interface comprises a first output terminal and a second output terminal; and
- coupling the interface to a first transmit antenna at the first output terminal and to a second transmit antenna at the second output terminal, wherein the interface is capable of transmitting the positive transmit signal and the negative transmit signal to the first transmit antenna and the second transmit antenna and of selectively driving the first transmit antenna and the second transmit antenna in either a differential mode or in a power-combining mode in which the interface isolates the second transmit antenna and combines power from the positive transmit signal and negative transmit signal to drive the first transmit antenna, wherein the interface further comprises:
- a 90-degree hybrid coupler having a first output port coupled to a first output terminal for the first transmit antenna, a second output port coupled to a second output terminal for the second transmit antenna, and a first input port coupled to receive the positive transmit signal and, a second input port coupled to receive the negative transmit signal; and
- a configurable phase shifter that couples the negative transmit signal to the second input port of the 90-degree hybrid coupler,
- wherein the configurable phase shifter is alternately set to zero degrees corresponding to the differential mode or set to 90 degrees corresponding to the power-combining mode.

12. The method of claim 11, wherein the interface further comprises:
- a first power amplifier that amplifies the positive transmit signal of the first input port of the 90-degree hybrid coupler; and
- a second power amplifier that amplifies the negative transmit signal of the second input port of the 90-degree hybrid coupler.

13. A method of manufacturing an integrated radar front end circuit, the method comprising:
- providing one or more transmitters, each of the one or more transmitters operable to generate a positive transmit signal and a negative transmit signal that together form a differential transmit signal; and
- coupling the one or more transmitters to an interface, wherein the interface comprises a first output terminal and a second output terminal; and
- coupling the interface to a first transmit antenna at the first output terminal and to a second transmit antenna at the second output terminal,
- wherein the interface is capable of transmitting the positive transmit signal and the negative transmit signal to the first transmit antenna and the second transmit antenna and of selectively driving the first transmit antenna and the second transmit antenna in either a differential mode or in a power-combining mode in which the interface isolates the second transmit antenna and combines power from the positive transmit signal and negative transmit signal to drive the first transmit antenna, wherein the interface comprises:
  - an output transformer having a primary coupled between the positive transmit signal and the negative transmit signal, and having a secondary selectively coupled between the first transmit antenna and the second transmit antenna; and
  - a switch arrangement that in a first configuration corresponding to the differential mode connects a terminal of the secondary to the second transmit antenna, and that in a second configuration corresponding to the power-combining mode connects the terminal to ground.

14. The method of claim 13, wherein the interface further comprises:
- a second switch arrangement that in the first configuration connects an opposite terminal of the secondary of the output transformer to the first transmit antenna, and that in a third configuration connects the opposite terminal of the secondary of the output transformer to ground.

15. The method of claim 14, wherein the interface further comprises:
- an input transformer having a primary and a secondary; and
- a power amplifier having input ports and output ports,
- wherein the primary of the input transformer is coupled between the positive transmit signal and the negative transmit signal, the secondary of the input transformer is coupled to the input ports of the power amplifier, and the output ports of the power amplifier are connected to the primary of the output transformer.

* * * * *